United States Patent [19]

Liu

[11] Patent Number: 5,330,832

[45] Date of Patent: Jul. 19, 1994

[54] PRESSURE-SENSITIVE ADHESIVES OF POLYVINYL METHYL ETHER

[75] Inventor: Wen-Feng Liu, Naperville, Ill.

[73] Assignee: Amoco Corporation, Chicago, Ill.

[21] Appl. No.: 34,256

[22] Filed: Mar. 22, 1993

[51] Int. Cl.$^5$ .................. C08L 29/10; C08L 31/04
[52] U.S. Cl. .................. 428/355; 525/222; 525/231; 428/513; 428/517
[58] Field of Search .................. 525/93, 222, 231; 428/355, 513, 517

[56] References Cited

U.S. PATENT DOCUMENTS 5,080,978 1/1992 Kulzick .................. 428/483
5,141,789 8/1992 Matsuzawa .................. 428/40

*Primary Examiner*—James J. Seidleck
*Assistant Examiner*—I. Zemel
*Attorney, Agent, or Firm*—Wallace L. Oliver

[57] ABSTRACT

A water soluble pressure sensitive adhesive composition is disclosed wherein polyvinyl methyl ether is the major component and a styrenic block copolymer is the second component, the polyvinyl methyl ether and styrenic block copolymer present in a weight ratio of from about 95:5 to about 88:12, said styrenic block copolymer in said composition comprising less than about 14 percent by weight of the weight of the polyvinyl methyl ether. The pressure sensitive adhesive is useful for bonding polyethylene, polypropylene, ethylene-propylene copolymers, and paper.

10 Claims, No Drawings

PRESSURE-SENSITIVE ADHESIVES OF POLYVINYL METHYL ETHER

BACKGROUND OF THE INVENTION

This invention relates to novel adhesive compositions and to the easy removal of adhesive residue from a substrate without use of an organic solvent. More particularly, it relates to compositions which are especially suited for use as pressure sensitive adhesives characterized by their excellent properties of outstanding creep resistance and cohesive strength and which are based on polyvinyl methyl ether. These adhesive compositions can be in the form of hot-melts or solvent-based compositions, either water-based or organic solvent-based. Water based compositions are preferred. Adhesive residues are water-removable without use of an organic solvent.

Hot-melt adhesives are frequently used because they can be cheaper than organic solvent based formulations, can give quick tack in the molten state, harden quickly on cooling, have no residual solvent odor or taste and their application is often a one-step procedure. However, hot-melt adhesives are not normally applicable to substrates subject to degradation at hot-melt application temperatures. Organic solvent-based adhesives can be more expensive because of organic solvent requirement and the potential need for solvent recovery. Water-based adhesives can be preferred because of cost and reduced environmental problems.

Water-based adhesives are taught in the prior art. Plitt, U.S. Pat. No. 2,985,609, teaches a water-based pressure sensitive adhesive comprising a composition of polyvinyl alcohol and polyethyleneimine. However, as Davis, U.S. Pat. No. 3,249,572 reports, the compositions of Plitt suffer from poor heat stability which results in gradual discoloration of the adhesive film as well as the substrate to which the adhesive is applied. Davis indicates the aging discoloration is overcome by the addition of acids to the Plitt adhesive compositions.

As is known in the art, pressure sensitive adhesives comprise a class of adhesive compositions which may be formulated from a variety of materials such as gums and resins of both natural and synthetic derivation, which typically are not water-soluble. When coated on a suitable substrate, these adhesive compositions share the common characteristic of being aggressively and permanently tacky at room temperature and are thus able to adhere to surfaces by the application of nothing more than manual pressure. Adhesives of this type may be applied to various substrates such as paper, cloth and plastic films, and the resulting coated substrate may then be converted to tapes and labels which are especially useful in the packaging field for any number of applications involving marking, sealing, reinforcing or bonding.

In order to be satisfactory in commercial usage, a pressure sensitive adhesive must, of course, possess good tack and tack retention properties, that is, the adhesive must firmly adhere to various surfaces and the adhesive films thereof should retain their properties on aging. An equally important property of such an adhesive in many applications is that of high internal strength, i.e., good cohesion. High internal or cohesive strength is a necessary characteristic of any adhesive composition which is to be employed in preparing adhesive products which must support considerable amounts of weight. It is also necessary that the property of high internal strength be instilled in a pressure sensitive adhesive without adversely affecting its tack and tack retention properties. Previously, internal strength had been imparted to pressure sensitive adhesives by such means as incorporating high molecular weight polymers in the adhesive formulation and requiring an organic solvent, such as toluol or methanol. Methods such as these, however, have generally proved unsatisfactory since cohesive strength was attained only at the expense of sacrificing the tack and adhesion properties of the composition.

Polyvinyl methyl ether (PVME) has been taught as a major component in pressure sensitive adhesives. Kuramoto, et al. U.S. Pat. No. 3,657,396, teaches a polyvinyl methyl ether-based pressure sensitive adhesive but discloses that PVME exhibits adhesive properties but fails to exhibit cohesive properties and has a highly increased fluidity when used independently. Kuramoto improved the properties of the PVME adhesives by addition of acrylic polymers and copolymers having superior properties of adhesion and cohesion, as compared to those properties of PVME. The examples of Kuramoto indicate organic solvents, toluol and methanol, are required to formulate the improved adhesive compositions.

The general formula for a pressure sensitive adhesive includes an elastomeric polymer, a tackifying resin, any necessary filter, various antioxidants and stabilizers. The three physical properties which must be considered are shear strength, peel strength, and tack. As noted above, high molecular weight polymers are frequently incorporated into the adhesive formulation to improve cohesive strength. For example, U.S. Pat. No. 2,937,956 teaches a pressure sensitive adhesive formulation comprising a mixture as an emulsion or dispersion of 20 to 90% by weight of polyvinyl methyl ether and 10 to 80% by weight of a copolymer of acrylonitrile and a substance copolymerizable therewith selected from the group consisting of styrene, butadiene, vinylether, acrylic acid esters and methacrylic acid esters, and mixtures thereof.

Block copolymers have been used in the past to produce adhesive compositions with improved adhesive power or peel strength. Serious limitations have existed as to characteristics of these compounds which have required formula modifications to achieve desired properties in the final pressure sensitive adhesive composition. For example, U.S. Pat. No. 3,932,332 teaches copolymers of alpha-methylstyrene and styrene prepared under controlled conditions as necessary to impart tack to elastomeric block copolymers of styrene and isoprene such as Shell Chemical Company's Kraton TM D 1107. U.S. Pat No. 4,359,551 teaches that a specific tackifier mixture in a blend of a modified block copolymer can serve as a hot-melt pressure sensitive adhesive composition which is excellent in holding power especially for paper. U.S. Pat. No. 4,361,663 teaches incorporation of tackifier resins into pressure sensitive adhesive compositions of about 50 to about 150 parts by weight per 100 parts by weight of a block copolymer of polystyrene and a polydiene such as manufactured by Shell Chemical Company under the trade name Kraton TM G.

Kraton TM block copolymers of polystyrene and a polydiene which have been conventionally used in adhesives technology have suffered from a serious drawback. The polydiene component in Kraton TM block copolymers can be highly unsaturated such as polybutadiene and polyisoprene. Because of this unsaturation, Kraton ™ block copolymers having a high degree of unsaturation are highly susceptible to thermal and oxidative degradation. Shell Chemical Company, in order to overcome these undesirable properties, has developed a series of Kraton ™ block copolymers in which the mid-unsaturated block is hydrogenated to yield a saturated mid-block, thus overcoming the problem of thermal and oxidative degradation. However, as taught in U.S. Pat. No. 4,361,663, it has been found that these saturated mid-block Kraton ™ copolymers are difficult to tackify.

Kulzick, et al. U.S. Pat. No. 5,080,978, discloses a PVME-based adhesive composition for hot-melt application wherein the composition comprises, as a first component, at least about 10 weight percent of PVME, and, as a second component, at least 10 weight percent of a thermoplastic resin. The second component is selected from the group consisting of $C_2$ to $C_6$ polyolefins and copolymers such as amorphous polypropylene, ethylene vinyl acetate copolymer, low density polyethylene, polystyrene, and block copolymers thereof with isoprene and 1,3-butadiene and ethylenealkylacrylate copolymers. A tackifier resin can also be present. Kulzick '978 teaches the amount of thermoplastic resin in a two-component adhesive composition, or in a multiple component composition, is preferably more than 20 percent by weight of the total composition. Kraton ™ 1107, made by Shell Chemical Company, Houston, Tex., Stereon 840A, made by Firestone Tire & Rubber Company, Akron, Ohio, and Vector 4113-D, made by Dexco Polymers, Houston, Tex., and hydrogenated variants, as well as ethylene-ethylacrylate copolymers, such as the DPD series made by Union Carbide, are taught as suitable thermoplastic resins. The adhesive compositions are prepared by blending the components in a melt at a temperature of about 160° C. to about 200° C. to obtain a homogeneous mixture and product that is essentially 100% solids. The tackifier component is optionable.

Pressure-sensitive adhesives are widely used in the form of adhesive tapes and labels. Conventional pressure sensitive adhesive tapes which provide good adhesive properties typically leave adhesive residues on the surface of the substrate when peeled. The adhesive residues are normally not removable unless an organic solvent is used to wipe the substrate. Since pressure-sensitive tapes and labels are frequently used to bond and-/or identify industrial and consumer items, an adhesive residue can constitute a removal problem not only for the user but also for the marketer of the industrial or consumer product. The problem of removing the residue can therefore result in a marketing problem.

This invention relates to improved pressure-sensitive adhesive compositions which comprise a water-soluble component and a water dispersible component, and which, upon application and removal, leave a residue which is water-soluble and water-removable from the surface of the substrate without need of an organic solvent. The invented composition has high internal or cohesive strength, as measured by shear strength, and has good adhesion and tackiness. The adhesive properties of the composition compare favorably with conventional pressure sensitive adhesive compositions upon a variety of substrate materials, including metals and plastics. The pressure sensitive adhesive composition is especially suited for bonding polyethylene, polypropylene and ethylene-propylene copolymers. The invented composition can be formulated for use as a water emulsion, a solvent solution or as a hot-melt.

It has been found that by combining polyvinyl methyl ether with limited amounts of a water base dispersion of a block copolymer of polystyrene and a polydiene, such as made by Shell Chemical Company under the trade name of Kraton ™, the resulting composition has superior adhesive properties. The water base dispersion of the block copolymer retains its water-dispersible properties as a dried component of an adhesive composition. Cohesive strength, peel strength and tack are equivalent to conventional pressure-sensitive adhesives. The adhesive residue, if any remains upon removal of the adhesive, is water-removable without application of an organic solvent. The pressure sensitive adhesive can be used as a hot-melt, a solvent solution or a water emulsion. The pressure sensitive adhesive composition is especially suited for bonding polyethylene, polypropylene, ethylene propylene copolymers, metal and paper.

The prior art has taught that pressure sensitive adhesive compositions containing PVME and a styrenic block copolymer can optionally require a tackifier resin, also that in a mixture of PVME and a block copolymer the block copolymer is preferably at least 20% by weight of the total two-component composition or about 25% of the weight of the PVME (U.S. Pat. No. 5,080,978). The prior art teaches that hydrogenated styrenic block co-polymer (Kraton ™) is difficult to tackify (U.S. Pat. No. 4,361,663), and that ratio of tackifying resin to Kraton ™ needs to be about 50:100 to 150:100 parts by weight. The prior art teaches that a water-soluble pressure sensitive adhesive composition consists essentially of a mixture of (a) PVME and (b) a water-soluble acrylic polymer (U.S. Pat. No. 3,657,396).

However, the present invented composition comprising polyvinyl methyl ether and a water-dispersible styrenic block copolymer in a weight ratio of about 95:5 to about 88:12, parts by weight, is water removable, has good cohesive strength and good peel strength in the presence of less than about 14 weight percent or less of styrenic block copolymer and excellent tack, in the absence of a tackifying resin, irrespective of the hydrogenation of the styrenic block copolymer.

SUMMARY OF THE INVENTION

The present invention comprises a water-removable pressure sensitive adhesive composition wherein polyvinyl methyl ether is the major component and a styrenic block copolymer is a second component, the polyvinyl methyl ether and the styrenic block copolymer present in a weight ratio of from about 95:5 to about 88:12. The polyvinyl methyl ether is present as a water-soluble component; the styrenic block copolymer is present as a water-dispersed component. The mid-unsaturated block of the styrenic block copolymer, optionally, can be hydrogenated to yield a saturated mid-block. The hydrogenated styrenic block copolymer resists thermal and oxidative degradation without affecting the tack of the pressure sensitive adhesive composition. The pressure sensitive adhesive can be used as a hot-melt, an organic solvent solution or as a water emulsion. The pressure-sensitive adhesive composition is especially suited for bonding polyethylene, polypropylene and ethylene-propylene copolymers. Adhesive residues are water removable without need of an organic solvent.

DETAILS OF THE INVENTION

The pressure sensitive adhesive composition of this invention contains two components. The first component is a polyvinyl alkyl ether, preferably a polyvinyl methyl ether, and, more particularly, a substantially amorphous polyvinyl methyl ether, present as a water-soluble component, and the second component is a styrenic block copolymer, present as a water-dispersible component such as Kraton TM D and Kraton TM G, made by Shell Chemical Company, or Stereon 840A, made by Firestone Tire & Rubber Company, or Vector 4113-D, made by Dexco Polymers. The ratio of polyvinyl methyl ether to styrenic block copolymer is from about 95:5 to about 88:12, parts by weight. Preferably, content of the styrenic block copolymer relative to the content of the polyvinyl methyl ether is no greater than about 14% by weight. A content of the styrenic block copolymer greater than about 14% by weight results in a decrease in the shear strength and peel strength of the pressure sensitive adhesive composition. An amount less than 5% by weight results in little or no improvement in shear strength.

Polyvinyl methyl ether is known in several forms, i.e., atactic, isotactic and syndiotactic. The atactic form (amorphous) is the preferred form for use in adhesives. The atactic form is a very viscous resin that is soluble in water and organic solvents. Typical number average molecular weight of these resins is from about 5,000 to about 100,000. The degree of polymerization, as indicated by the average molecular weight of the polymer, determines whether the PVME is a tacky soft resin or a more rubber-like substance. The solubility of PVME in water is reported as due to the hydrogen bonding between the water molecules and the ether oxygen. The intrinsically insoluble PVME is surrounded by water molecules and is thus solvated. But the bridge bonds are broken in the presence of heat and the nonhydrated polymer precipitates. The precipitation point is influenced by the concentration of the aqueous solution and the presence of any organic solvents present. The formulation of a water-base PVME adhesive advantageously is as a mixture at room temperature.

The polyvinyl alkyl ethers which may be employed are polymers which are liquids or semi-solids at room temperature and are characterized by having an inherent viscosity in chloroform within the range of about 0.2 to about 3.0. Preferred is a polyvinyl methyl ether with an intrinsic viscosity of from 0.7 to 0.8, measured in chloroform using a Ubbelohde viscometer.

The styrenic block copolymer is a thermoplastic rubber which is a styrene three block copolymer with styrene end blocks and a rubbery midblock which can be either a rubbery (butadiene) midblock or a rubbery isoprene midblock. The midblock can be stabilized against thermal degradation and oxidation by hydrogenation. Styrene content is the major difference between the several grades of Kraton TM thermoplastic rubbers available. The styrenic block copolymer is formulated as a water base dispersion.

Despite the teachings of the prior art that in a two component adhesive system, wherein the thermoplastic resin is a styrenic block copolymer, the thermoplastic resin should be at least 15 to 20 percent by weight of the adhesive composition, in the present invention it is preferred that the percentage of the styrenic block copolymer be less than about 14 weight percent of the weight of the PVME and it is essential that the ratio of PVME to styrenic copolymer be in the range from about 95:5 to about 88:12. Surprisingly, it has been found that concentrations of the styrenic block copolymer greater than about 14 weight percent relative to the concentration of the PVME result in loss of shear strength and peel strength of the two-component formulated adhesive. Adhesive formulations in a two-component system containing less than about 14 weight percent of styrenic block copolymers with styrene and a rubbery (ethylene-butylene) midblock (S-EB-S), or with styrene and a rubbery isoprene midblock (SIS), or with a rubbery butadiene midblock (SBS) demonstrate good shear strength, good peel strength and good tack superior to conventional pressure sensitive adhesive formulations but with the advantage that any adhesive residue is water-soluble and easily removable upon wiping the residue from a surface with a wet cloth.

The adhesive composition comprises mainly PVME and styrene block copolymers (SBC's). Dry weight ratio of the two components can range from 95:5 to 88:12. The composition can be applied onto backings via the form of water emulsion, solution, and hot-melt. The SBC's include styrene-butadiene-styrene (SBS), styrene-isoprene-styrene (SIS), styrene-ethylene-butylene-styrene (SEBS), and other styrene containing copolymers. Among them, SBS and SIS are preferred. Antioxidants, stabilizers, oil, and tackifiers may also be included. Surfactants may be used for viscosity stabilization and for improving wetting.

Pressure sensitive adhesives are those adhesives which bond almost instantaneously when contact pressure is applied to force the mating surfaces together. Some pressure sensitive adhesives have aggressive tack or "quick tack" at room temperature, and tend to bond instantly upon contact. The pressure-sensitive adhesives of this invention, on the other hand, typically require light pressure to form a bond of appreciable strength. The two-component composition utilizes advantageously the non-migrating characteristics of polyvinyl methyl ether as modified by the presence of the styrenic block copolymer to obtain a rheology with sufficient flow under pressure to form a strong adhesive bond while nevertheless maintaining a high level of cohesion, peel strength and tack.

Kraton TM D and Kraton TM G (Shell Chemical Company) are thermoplastic rubbers which are block copolymers with styrene end blocks and midblocks which can be ethylene-butylene (S-EB-S), isoprene (SIS), or butadiene (SBS). Kraton TM G 1657 is a 13/87 styrene/rubber ratio three block copolymer with styrene endblocks and a rubbery (ethylene-butylene) midblock (S-EB-S) wherein the midblock is saturated. Kraton TM D-1101 is a styrene-butylene-styrene (SBS) with a styrene/rubber ratio of 31/69. Kraton TM -D-1107 is a styrene-isoprene-styrene (SIS) with a styrene/rubber ratio of 14/86.

Prinlin TM compounds (Pierce & Stevens, Varitech Division, Buffalo, N.Y.) are water base dispersions of Kraton TM rubber. Prinlin TM B7137X-1 is Kraton TM D1107 modified with a wood rosin derivative. Prinlin TM B7138A is Kraton TM G1657 modified with wood rosin and hydrogenated rosin ester. Prinlin TM B7138AD is Kraton TM G1657/FG1901, a styrene-ethylene-butylene-styrene (S-EB-S). Prinlin TM B7248A is Kraton TM FG1901, a S-EB-S copolymer. Prinlin TM B7216A is Kraton TM D 1101 modified with wood rosin and hydrogenated rosin ester.

The properties of the pressure-sensitive adhesives of this invention have been determined, loop tack according to the TLMI (Tape and Label Manufacturing Institute) loop tack procedure, peel adhesion according to the Peel Adhesion Procedure PSTC-1 for single coated pressure sensitive tapes at 180° angle of the Pressure Sensitive Tape Council (PSTC), and shear strength according to PSTC-7 procedure, Holding Power of Pressure Sensitive Tape.

Loop tack is reported in the amount of force, grams per square inch, required to free a test specimen in the form of a loop from a bond to a substrate. The test specimen is a tape 1"×5". The specimen is formed into a tear drop shaped loop with the adhesive surface towards the outside. The specimen is lowered to contact the surface of a clean stainless steel test panel to form a bond. The test specimen is then raised to break the bond. A force guage measures the force required to break the bond.

Peel adhesion is the force required to remove a pressure sensitive tape from a test panel or its own backing. The test specimen is ½ to 1 inch in width and approximately 12 inches in length. The peel adhesion value is reported in ounces per 1 inch width to the nearest 0.1 ounce/inch. One end of the test specimen is touched to an end of the test panel, then the tape is rolled onto the panel to apply the tape to the panel. The free end of the tape is doubled back at an angle of 180° and is peeled from the panel. The force necessary to remove the second and third inches of the tape from the panel is the adhesion value.

Shear strength is the ability of a pressure sensitive tape to remain adhered to a surface under a load applied parallel to the surface of the tape. The test specimen is 0.5±0.016 inches wide and approximately 6 inches long. The tape is applied to a standard surface. A standard mass of 500 or 1,000 grams is applied and allowed to act until failure. The time elapsed until the test specimen completely separates from the test panel is the measure of shear strength.

The following examples are exemplary of the instant invention but are not meant to restrict the scope of the invention.

EXAMPLE 1

A 35% aqueous solution of PVME (Amoco 14712-33), (Amoco Chemical Co.), and mixtures of the PVME solution and a water base SBC dispersion (Prinlin TM B7138A dispersion of SEBS from Pierce & Stevens) at 10, 25, and 50 pph (parts SEBS per hundred PVME) were each applied onto a 2 mil thick poly(ethylene terephthalate) (PET) film. The coated films were placed in a convection oven and dried at 95° C. for 15 minutes. The dry samples, after conditioning for 24 hours in a constant temperature (73.4°+3.6° F.) and humidity room, (50+5% relative humidity) (CTH) were subjected to the following three tests: 180° peel test, shear resistance test, the tackiness test. Standard test procedures from the Pressure Sensitive Tape Council (PSTC) were followed for the peel and shear tests and procedures from the Tape & Label Manufacturing Institute (TLMI) were followed for the tackiness test. The dwell time for peel test was 24 hrs and stainless steel was used for the substrate. Shear resistance was for 0.5 in×0.5 in×500 g. Results are listed in Table I. Results indicated a 2 to 3 times shear resistance increase when up to 10 pph of the SEBS was added to the PVME. The PVME did not show a decrease in peel strength by this addition. Addition over 10 pph resulted in a decrease in shear strength and peel strength.

TABLE I

Loop Tack, Peel Adhesion, Shear Strength PVME and SEBS

| Formulation (Weight in grams) | I | II | III | IV |
|---|---|---|---|---|
| 35% Aqueous Amoco 14712-33 (PVME) | 100 | 100 | 100 | 100 |
| Prinlin TM B7138A Kraton TM G1657) | | 8.4 | 21.1 | 42.2 |
| PPH (SEBS/PVME) | 0 | 10 | 25 | 50 |
| Loop Tack, grams/inch | 400.0 | 241.0 | 4.7 | 4.1 |
| Peel Adhesion (PSTC-1) | | | | |
| 24 Hours | 4.0 | 4.1 | 0.8 | 0.3 |
| Residue, % of Adhesive | 50 | 40 | Slight | Slight |
| Shear Strength (500 gm weight) | | | | |
| Minutes | 38 | 83 | 62 | 4 |

EXAMPLE II

A mixture of 35% aqueous solution of PVME and a water base SIS dispersion (Pierce & Stevens Prinlin TM B 7137X-1) (Formulation I), a mixture of the PVME solution with a water base SEBS dispersion (Pierce & Stevens Prinlin TM B7248A) (Formulation II), a mixture of the PVME solution with a water base SBS dispersion (Pierce & Stevens Prinlin TM B 7216A) (Formulation III), and a mixture of the PVME solution with a water base SEBS dispersion (Pierce & Stevens Prinlin TM B7138A1), (Formulation IV), at ratios of 10 pph based on the PVME were prepared. A Lightnin mixer was used to prepare the mixtures and the mixer speed was set at 100 rpm.

The mixtures were each applied onto a 2 mil thick PET film. Same procedures as in the above Example I were followed for sample preparations and testings. Test results are listed in Table II. The results showed that the shear resistance of the PVME was enhanced by the different SBC's and the formulations exhibited good peel strength and tackiness.

TABLE II

Loop Tack, Peel Adhesion, Shear Strength- PVME and SIS, SEBS, and SBS Copolymer Adhesives

| Formulations (Weight in grams) | I | II | III | IV |
|---|---|---|---|---|
| 35% Aqueous - Amoco 14712-33 (PVME) | 100 | 100 | 100 | 100 |
| Prinlin TM B713X-1 (SIS, Kraton TM D1107) | 8.1 | | | |
| Prinlin TM B7248A (SEBS, Kraton TM FG1901) | | 9.2 | | |
| Prinlin TM B7216A (SBS, Kraton TM D1101) | | | 8.1 | |
| Prinlin TM B7138AD (SEBS, Kraton TM G1657/FG1901) | | | | 8.4 |
| Loop Tack, grams/in (Average of Readings) | 198–505 (469) | 162–389 (252) | 218–752 (533) | 142–672 (367) |
| Peel Adhesion, oz./in. | | | | |
| 20 minutes (Average) | 4.1–4.3 (4.2) | 3.7–3.9 (3.8) | 4.1–4.7 (4.4) | 3.5–3.6 (3.5) |
| 24 hours (Average) | 4.3–4.6 (4.4) | 3.8–4.0 (3.9) | 4.4–4.7 (4.6) | 3.8–4.2 (4.0) |
| Shear Strength (500 gm weight) | | | | |
| Minutes | 77–97 | 51–108 | 63–81 | 71–99 |

TABLE II-continued

Loop Tack, Peel Adhesion, Shear Strength-
PVME and SIS, SEBS, and SBS Copolymer Adhesives

| Formulations (Weight in grams) | I | II | III | IV |
|---|---|---|---|---|
| (Average) | (88) | (88) | (69) | (88) |

Note:
Dry coating thickness = 1 mil

EXAMPLE III

A mixture of 30% aqueous solution of PVME and Prinilin TM 7137X-1 (Formulation I), a mixture of the PVME solution and Prinilin TM 7248A (Formulation II), and a mixture of the PVME solution and Prinilin TM B 7216A (Formulation III), all at a ratio of 10 pph were prepared. The mixtures were applied onto a release paper. The coated release paper were dried following the same procedures as in Example I. The dry samples were then combined onto litho paper by a laminator at a nip pressure of 60 psi. The samples were conditioned and tested following the same procedures as in the above examples. Polypropylene tensile bars were used as substrates for the adhesive test. The samples were also evaluated for water removability. The three formulations all exhibited a paper tare bond and residues were all easily water removable. Test results are listed in Table III.

TABLE III

Peel Adhesion and Water Removability-
PVME and SIS, SEBS and SBS Copolymer Adhesives

| Formulations: (Weight in grams) | I | II | III |
|---|---|---|---|
| 30% Aqueous-Amoco 14715-108 (PVME) | 29 | 29 | 29 |
| Prinlin TM B7137X-1 (SIS) | 2.0 | | |
| Prinlin TM B7248A (SEBS) | | 2.3 | |
| Prinlin TM B7216A (SBS) | | | 2.0 |
| Peel Adhesion | PT | PT | PT |
| 24 hours | | | |
| Water Removable | Easy | Easy | Easy |

Note:
PT = paper tear
Dry coating thickness = 1 mil

That which is claimed is:

1. A water-removable pressure sensitive adhesive composition containing polyvinyl methyl ether and a styrenic block copolymer wherein polyvinyl methyl ether comprises the major component of said pressure sensitive adhesive composition and present as water-soluble first component and a water-dispersible styrenic block copolymer is a second component, the polyvinyl methyl ether and the styrenic block copolymer present in said pressure sensitive adhesive composition in a weight ratio of from about 95:5 to about 88:12, parts by weight.

2. The pressure sensitive adhesive composition of claim 1 wherein content of said styrenic block copolymer relative to content of polyvinyl methyl ether comprises less than a weight ratio of about 88:12, parts by weight, of said polyvinyl methyl ether to styrenic block copolymer and said adhesive composition has adhesive strength and peel strength, and in the absence of a tackifying resin, has tack.

3. The pressure sensitive adhesive composition of claim 1 wherein said styrenic block copolymer is selected from the group of styrenic block copolymers consisting of styrenic block copolymers with styrene end blocks and a midblock selected from the group consisting of, isoprene, butadiene, and ethylene-propylene.

4. The pressure sensitive adhesive composition of claim 1 wherein midblock of said styrenic block copolymer is saturated.

5. The pressure sensitive adhesive composition of claim 1 wherein said adhesive composition is water-based and residue of said adhesive composition is water removable.

6. The pressure sensitive adhesive composition of claim 1 wherein said adhesive composition is used as a water emulsion, an organic solvent solution and a hot-melt.

7. A bonded structure comprising the adhesive composition of claim 1 and a polyethylene substrate.

8. A bonded structure comprising the adhesive compositions of claim 1 and a polypropylene substrate.

9. A bonded structure comprising the adhesive composition of claim 1 and an ethylene-propylene copolymer substrate.

10. A bonded structure comprising the adhesive composition of claim 1 and a paper substrate.

* * * * *